(12) United States Patent
Trisnadi et al.

(10) Patent No.: US 7,043,110 B1
(45) Date of Patent: May 9, 2006

(54) WAVELENGTH-SELECTIVE SWITCH AND EQUALIZER

(75) Inventors: Jahja I. Trisnadi, Cupertino, CA (US); Clinton B. Carlisle, Palo Alto, CA (US)

(73) Assignee: Silicon Light Machines Corporation, Sunnyvale, CA (US)

( * ) Notice: Subject to any disclaimer, the term of this patent is extended or adjusted under 35 U.S.C. 154(b) by 165 days.

(21) Appl. No.: 10/315,792

(22) Filed: Dec. 10, 2002

(51) Int. Cl.
*G02B 6/26* (2006.01)
*G02B 6/42* (2006.01)
*G02B 6/34* (2006.01)

(52) U.S. Cl. .............................. 385/16; 385/18; 385/37

(58) Field of Classification Search ................ 385/18, 385/24, 16; 359/290, 291
See application file for complete search history.

(56) References Cited

U.S. PATENT DOCUMENTS

| | | | |
|---|---|---|---|
| 6,005,992 A | 12/1999 | Augustsson et al. | |
| 6,169,624 B1 | 1/2001 | Godil et al. | |
| 6,172,796 B1* | 1/2001 | Kowarz et al. | 359/290 |
| 6,268,952 B1* | 7/2001 | Godil et al. | 359/291 |
| 6,285,500 B1* | 9/2001 | Ranalli et al. | 359/497 |
| 6,335,831 B1* | 1/2002 | Kowarz et al. | 359/573 |
| 6,345,136 B1 | 2/2002 | Augustsson et al. | |
| 6,374,019 B1 | 4/2002 | Gustavsson | |
| 6,775,047 B1* | 8/2004 | Leung et al. | 359/291 |
| 2002/0131687 A1* | 9/2002 | Wilde | 385/24 |
| 2002/0176149 A1* | 11/2002 | Davis et al. | 359/290 |
| 2004/0047632 A1* | 3/2004 | Powell | 398/83 |

OTHER PUBLICATIONS

Melcher et al., "Design and fabrication of a prototype projection data monitor with high information content," 1998, IBM, pp. 1-15.*
Corrigan, Robert, et al, "Silicon Light Machines—Grating Light Valve Technology Brief", Jun. 2001, pp. 1-8, Silicon Light Machines, Sunnyvale, California.
Allan, Roger, "Highly Accurate Dynamic Gain Equalizer Controls Optical Power Precisely", Electronic Design, Feb. 4, 2002. pp. 37-40.

* cited by examiner

*Primary Examiner*—Frank G. Font
*Assistant Examiner*—Mary El-Shammaa
(74) *Attorney, Agent, or Firm*—Okamoto & Benedicto LLP (57) ABSTRACT

One embodiment disclosed relates to a method for wavelength-selective switching and equalization. The method includes dispersing an incoming multiplexed signal into wavelength components, focusing the wavelength components onto different portions of a controllable light diffractor array, and controllably diffracting each wavelength component such that each said component is individually attenuated and arrives at the individually selected output without substantial crosstalk between the outputs. Another embodiment relates to a wavelength-selective switching device with integrated equalizer functionality. Another embodiment relates to an optical apparatus for wavelength-selective switching and equalization. The apparatus includes a means for controllably diffracting each wavelength component of a multiplexed input such that each said component is controllably attenuated and directed to arrive at an individually selected output.

11 Claims, 8 Drawing Sheets

Fig. 1: Functional diagram of the 1×2 WSSE.

Fig. 2: Cross-section of the N-N step GLV device.

Fig. 3: Diagram of the 1×2 WSSE.

Ch 3 to OUT 1, others to OUT 2

740

Ch 3 to OUT 2, others to OUT 1

WAVELENGTH-SELECTIVE SWITCH AND EQUALIZER

BACKGROUND OF THE INVENTION

1. Field of the Invention

The present invention relates generally to devices for telecommunications. More particularly, the invention relates to devices for wavelength division multiplexed networks.

2. Description of the Background Art

To further increase the capacity on existing optical networks a number of methods are known. One means is to use a type of wavelength division multiplexing (WDM) technique in order to improve the degree of utilization of the available bandwidth.

One problem to overcome in WDM networks relates to managing the frequently changing network operation. Reconfigurable systems are needed in this regard.

A different problem in WDM networks pertains to non-uniform gains that are wavelength dependent. For example, erbium doped fiber amplifiers (EDFA) exhibit a non-uniform gain spectrum that differs depending on the WDM channel. It is desirable to be able to equalize such non-uniform gain between channels.

SUMMARY

One embodiment of the invention relates to a method for wavelength-selective switching and equalization. The method includes dispersing an incoming multiplexed signal into wavelength components, focusing the wavelength components onto different portions of a controllable light diffractor array, and controllably diffracting each wavelength component such that each component is individually attenuated and directed and arrives at the individually selected output without substantial crosstalk between the outputs.

Another embodiment relates to a wavelength-selective switching device with integrated equalizer functionality.

Another embodiment relates to an optical apparatus for wavelength-selective switching and equalization. The apparatus includes a means for controllably diffracting each wavelength component of a multiplexed input such that each said component is controllably attenuated and directed to arrive at an individually selected output.

These and other features of the present invention will be readily apparent to persons of ordinary skill in the art upon reading the entirety of this disclosure, which includes the accompanying drawings and claims.

The use of the same reference label in different drawings indicates the same or like components. Drawings are not to scale unless otherwise noted.

DETAILED DESCRIPTION

As discussed above, reconfigurable systems are needed to manage the continuously changing network operation in modern WDM networks. The reconfigurable systems may utilize controllable switching devices to re-route the optical traffic. One example of such a device is a 1×2 wavelength-selective switch (WSS). The 1×2 WSS is used to divide an incoming WDM line into two WDM lines with complementary spectral components.

Another separate device is a dynamic channel equalizer. The equalizer may be used, for example, to ensure the power balance of all the WDM lines.

In this specification, the multiplexed signals are referred to generically as "WDM" signals. We intend "WDM" to be inclusive of WDM, DWDM, and other densities of wavelength division multiplexed signals.

Figure 1:
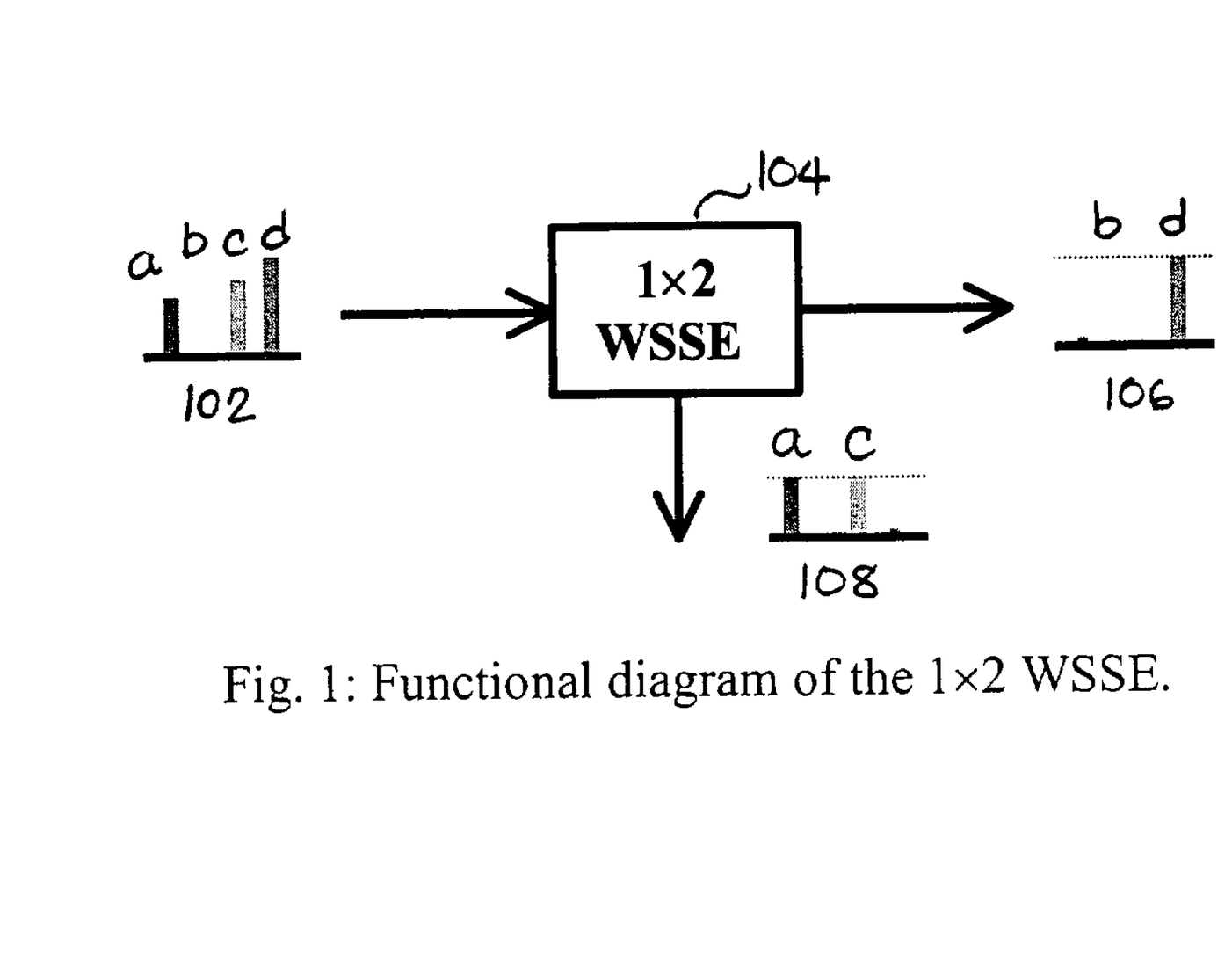
FIG. 1 is a functional diagram of a 1×2 wavelength-selective switch and equalizer (WSSE) in accordance with an embodiment of the invention.

FIG. 1 is a functional diagram of a 1×2 wavelength-selective switch and equalizer (WSSE) in accordance with an embodiment of the invention. Such a WSSE device advantageously combines the prior separate functionalities of a WSS device and a dynamic channel equalizer device. The functional diagram depicts, as an example, an input 102 with four wavelength components (a, b, c and d). The input is received by the 1×2 WSSE 104. The "1×2" indicates that there is one input WDM signal and two output WDM signals. The WSSE 104 has two outputs 106 and 108.

In this instance, the first output 106 is shown to include the second and fourth wavelength components (b and d), while the second output 108 is shown to include the first and third wavelength components (a and c). In other words, the WSSE 104 selected the first wavelength component (a) to be switched to the second output 108, the second wavelength component (b) to be switched to the first output 106, the third wavelength component (c) to be switched to the second output 108, and the fourth wavelength component (d) to be switched to the first output 106.

Furthermore, the wavelength components are shown to have been equalized by the WSSE 104. In this instance, the second and fourth components (b and d) have been equalized to a first magnitude, and the first and third components (a and c) have been equalized to a second magnitude that is different than the first. This equalization is also advantageously performed by the WSSE device 104 in accordance with an embodiment of the invention.

Figure 2:
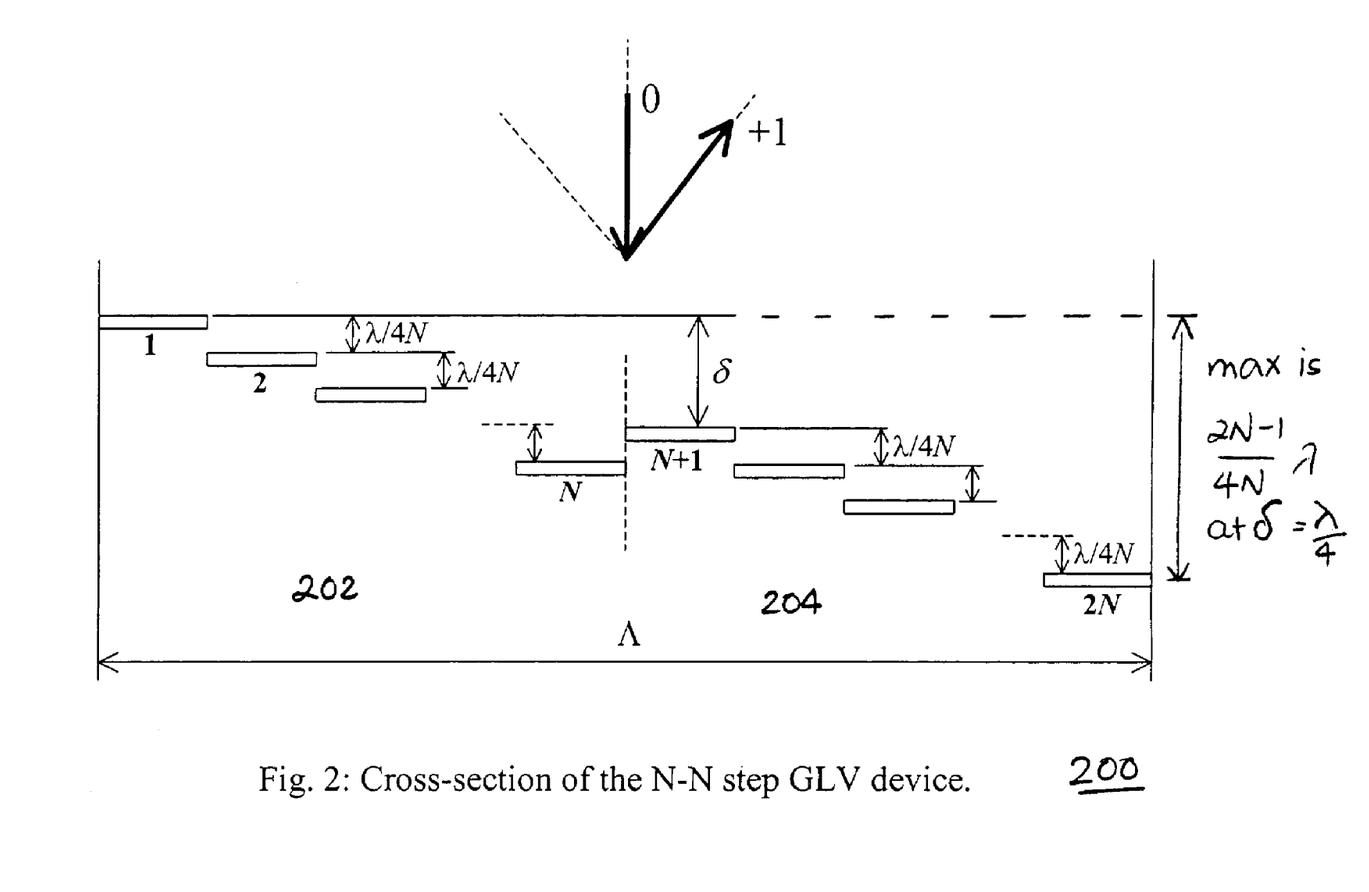
FIG. 2 depicts a cross-sectional view of a N—N step grating light valve™ (GLV®) type device in accordance with an embodiment of the invention.

FIG. 2 depicts a cross-sectional view of a N—N step grating light valve™ (GLV®) type device or ribbon group 200. Such a device 200 may be advantageously utilized to create a 1×2 WSSE in accordance with an embodiment of the invention. The N—N step GLV® type device 200 includes a group of 2N reflective elements or ribbons. The group of 2N elements are divided into two subgroups of N elements each. In FIG. 2, the first subgroup 202 includes elements labeled 1 through N, and the second subgroup 204 includes elements labeled N+1 through 2N.

As shown, the device 200 is in a "+1" configuration. In the +1 configuration, within each subgroup (202 or 204), the reflective elements are configured in steps going from high on the left side to low on the right side. With such a configuration, light incident onto the device is primarily diffracted towards one of the first order, e.g. +1, and none towards the other first order, e.g. −1. As shown in FIG. 2, the arrow labeled "0" represents the incident light at an angle perpendicular to the device, and the arrow labeled "+1" represents the positive first-order diffraction (referred to as the "+1" diffraction) which travels towards the upper right. Alternatively, of course, the device could be set in a "−1" configuration. In the −1 configuration, the steps could go from low on the left side to high on the right side. With that configuration of elements, the incident light would be primarily diffracted into the negative first-order diffraction (referred to as the "−1" diffraction) which travels towards the upper left.

In accordance with an embodiment of the invention, the steps in each ribbon subgroup are spaced evenly with a vertical spacing of A λ/4N or thereabout, where λ is the wavelength of the light. That vertical spacing minimizes the crosstalk between the +1 diffraction towards the upper right and the −1 diffraction towards the upper left (which couples to the alternative output port 108, and thus represents undesirable cross-talk). For example, in the +1 configuration shown in FIG. 2, the incident light is diffracted into the +1 diffraction (the +1 arrow illustrated) while diffraction into the −1 diffraction (dashed line without arrow) is kept at a minimum. This minimization of crosstalk advantageously enables the device to be used as an optical switch.

In a preferred embodiment of the invention, there is a displacement δ between the first subgroup 202 of N elements and the second subgroup 204 of N elements. The displacement δ may be utilized to modulate the diffraction efficiency of the device while the crosstalk between the two 1st orders remains at a minimum. This advantageously enables the device to be used for equalization in addition to the switching functionality.

For the following calculation, consider the case where N=2. In that case, each subgroup of elements has two elements, and the vertical spacing becomes λ/8 between the elements in each subgroup. In addition, assume a horizontal inter-ribbon gap of zero for simplicity. Based on scalar diffraction, the 1 st-order normalized diffraction efficiencies is calculated to be $$\eta_{\pm 1} = \frac{8}{\pi^2} \sin^2\left(\frac{2\pi\delta}{\lambda}\right)\cos^2\left(\frac{\pi}{4} \mp \frac{\pi}{4}\text{sgn}\right)$$

where sgn=+1 for the +1 configuration, and sgn=−1 for the −1 configuration. This means that for the +1 configuration $$\eta_{+1} = \frac{8}{\pi^2} \sin^2\left(\frac{2\pi\delta}{\lambda}\right)$$

for the +1 diffraction, and $\eta_{-1}=0$ for the −1 diffraction. Similarly, when the device 200 is in the −1 configuration, the 1 st-order normalized diffraction efficiency is $\eta_{+1}=0$ for the +1 diffraction, and $$\eta_{-1} = \frac{8}{\pi^2} \sin^2\left(\frac{2\pi\delta}{\lambda}\right)$$

for the −1 diffraction. Thus, no crosstalk is shown under this scalar calculation and ideal ribbon deflections. Furthermore, the displacement δ may be used to modulate the active diffraction between a minimum value of zero when δ=0 and a maximum value of about 0.81 when δ=λ/4 with no crosstalk for all values of δ.

Figure 3:
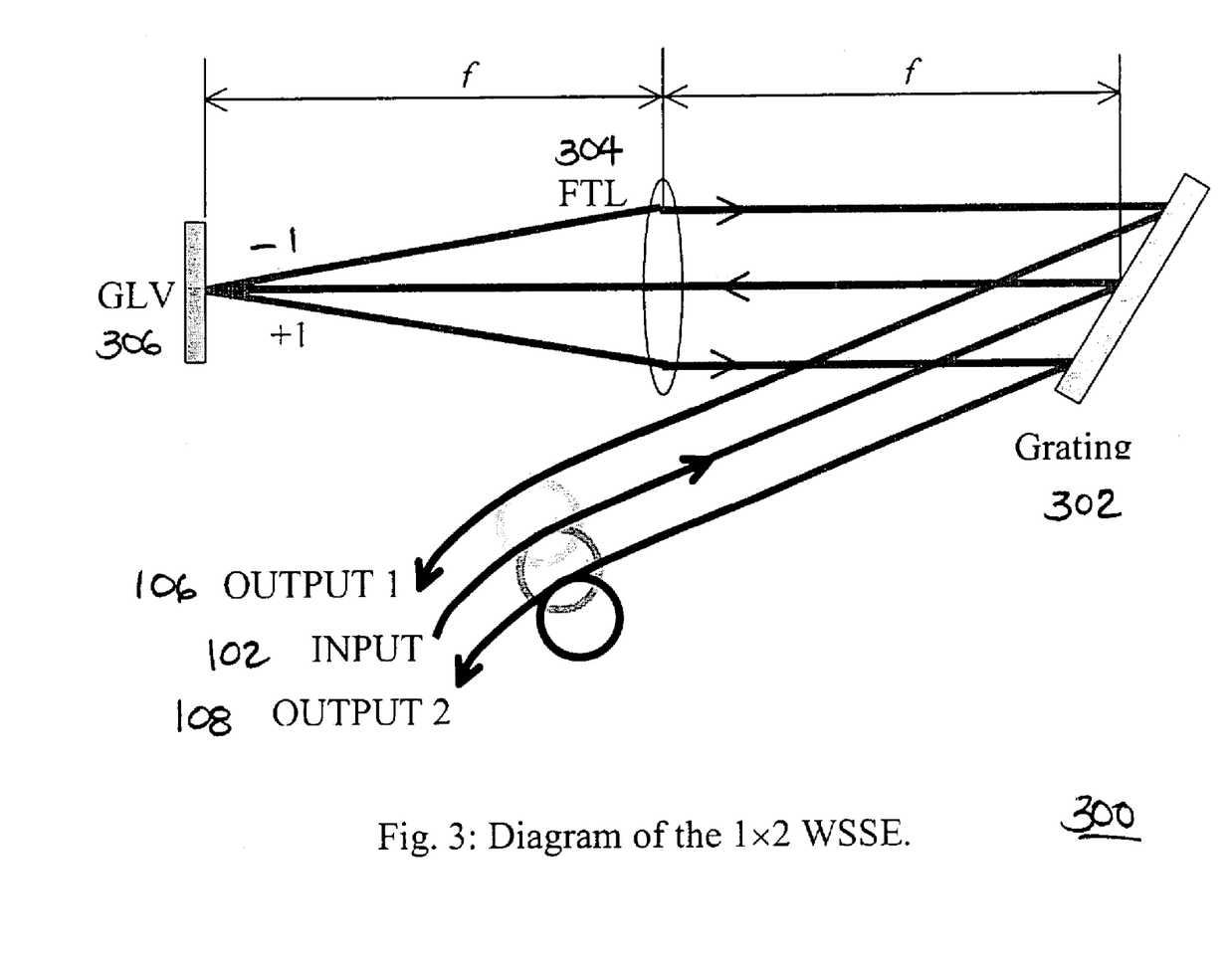
FIG. 3 is a schematic diagram of a 1×2 WSSE in accordance with an embodiment of the invention.

FIG. 3 is a schematic diagram of a 1×2 WSSE 300 in accordance with an embodiment of the invention. The 1×2 WSSE 300 has one WDM input 102 and two WDM outputs 106 and 108. The input and outputs correspond to those illustrated in FIG. 1.

The input 102 may be adapted to launch the input WDM signal from the input optical fiber through freespace, collimated (not shown), and directed onto a static optical grating 302. The path of the input WDM signal to the grating 302 is depicted in FIG. 3.

The grating 302 may comprise, for example, a blazed type grating or other device with similar functionality. The grating 302 disperses the wavelength components or channels of the input 102 such that different wavelengths diffract at different angles from the grating 302. For purposes of simplicity in the illustration, FIG. 3 depicts the path of one of the wavelength components being diffracted by the grating 302.

A Fourier transform lens (FTL) 304 used in f—f configuration, or device with similar functionality, may be used to map the different angles onto linear channel positions. In other words, the FTL 304 focuses the dispersed wavelength components onto different positions in a controllable light diffractor array 306. The f—f configuration is illustrated in FIG. 3 and relates to focal length f of the FTL 304. In a preferred embodiment, the array 306 comprises an array of N—N step GLV or GLV-type devices or ribbon groups 200. Each wavelength component is mapped onto a different ribbon group in the array 306. The simplified illustration in FIG. 3 depicts one of the wavelength components being mapped to a ribbon group near the middle of the array 306.

Each ribbon group receiving a wavelength component is set to switch that wavelength component either to Output 1 or Output 2. For example, an N—N step GLV-type device 200 may be set to switch an incident wavelength component to Output 1 by putting the device in the −1 configuration and may be set to switch the incident wavelength component to Output 2 by putting the device in the +1 configuration. In the +1 configuration, the +1 diffraction would be active (while the −1 diffraction would be suppressed). The +1 diffraction is illustrated in FIG. 3 as traveling from the controllable array 306 back to the FTL 304. The FTL 304 maps the +1 diffraction to a specific location on the grating 302. The +1 diffractions for the various channels are then effectively re-multiplexed by the grating 302 and sent to the Output 2. Similarly, in the −1 configuration, the −1 diffraction would be active (while the +1 diffraction would be suppressed). The −1 diffraction is illustrated in FIG. 3 as traveling from the controllable array 306 back to the FTL 304. The FTL 304 maps the −1 diffraction to a separate location on the grating 302. The −1 diffractions for the various channels are then effectively re-multiplexed by the grating 302 and sent to the Output 1.

Furthermore, in addition to selectively switching a wavelength component as discussed above, the WSSE 300 can also modulate the amplitude of each component, for example, for purposes of channel equalization. In accordance with the preferred embodiment, the amplitude modulation for a particular wavelength component may be accomplished by controlling the displacement δ in the GLV device 200.

Figure 4A:
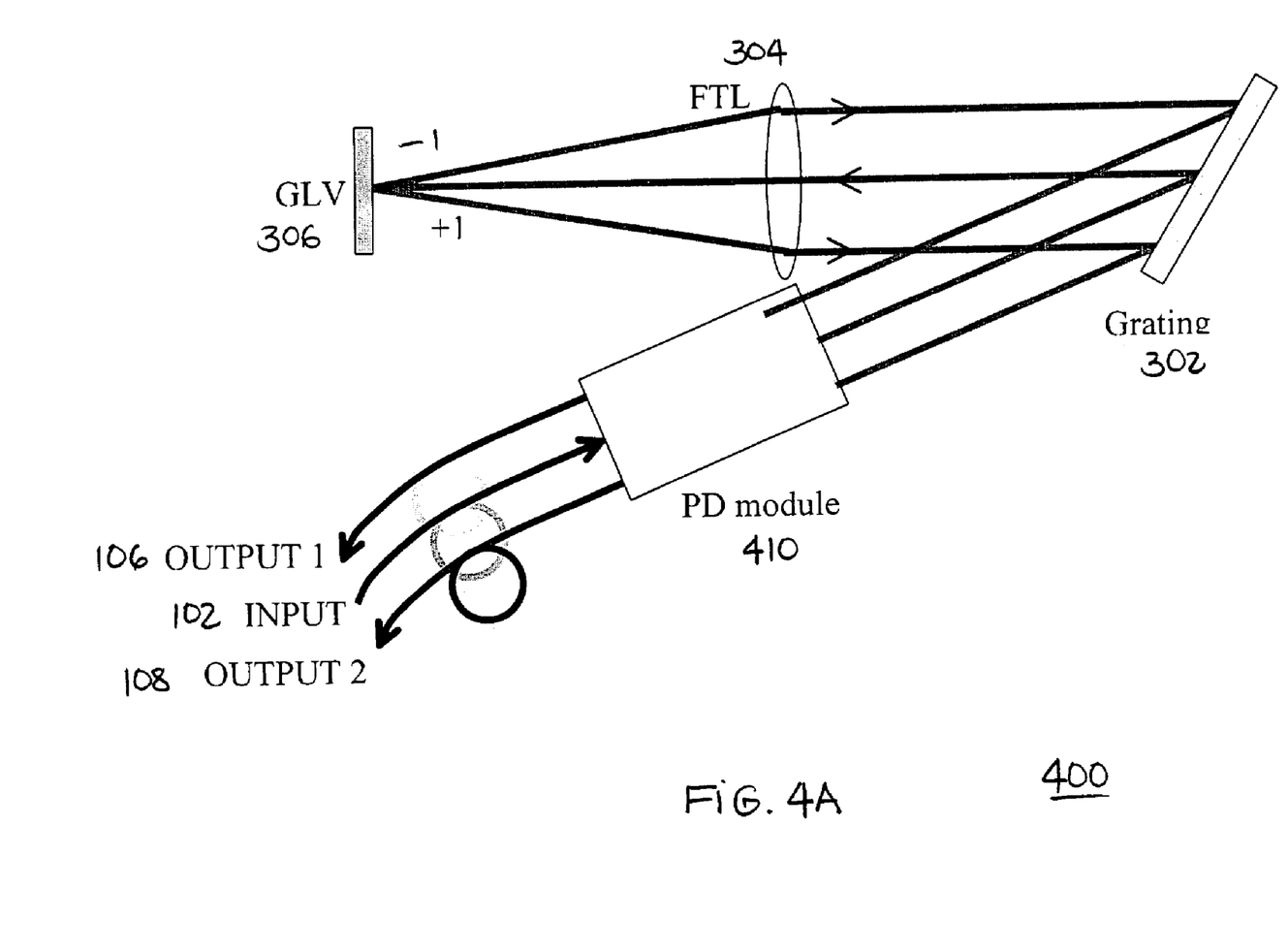
FIGS. 4A and 4B are schematic diagrams depicting a 1×2 WSSE with polarization diversity in accordance with an embodiment of the invention.
Figure 4B:
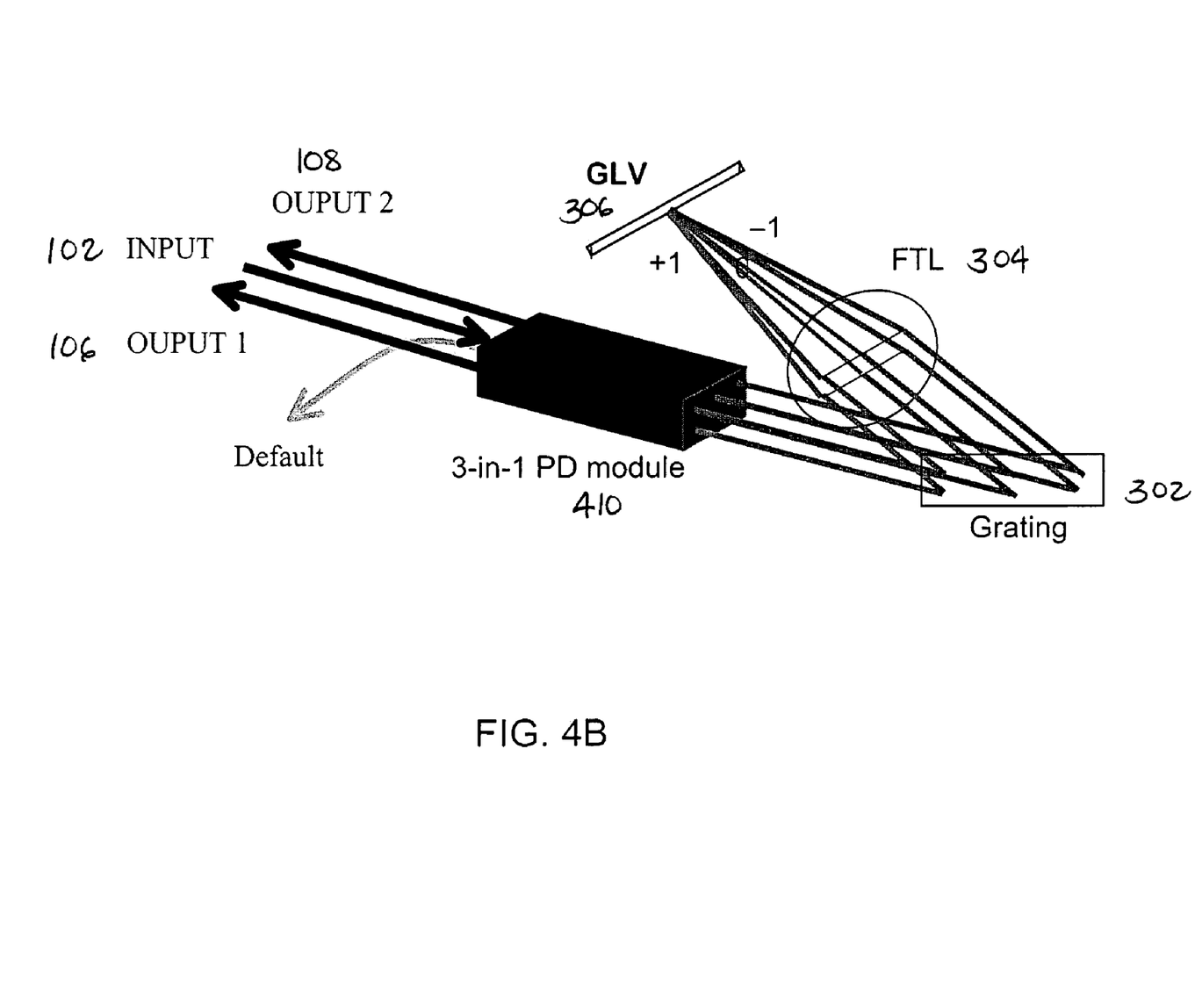

FIGS. 4A and 4B are schematic diagrams depicting a 1×2 WSSE with polarization diversity in accordance with an embodiment of the invention. A 3-in-1 polarization diversity (PD) module 410 may be configured to receive the WSSE input signal 102 and split the signal 102 into two polarization components. One of the polarization components is then rotated such that the two components have the same predetermined polarization. The PD module 410 may be configured such that said predetermined polarization is consistent no matter the polarization of the input signal 102. Regarding each WSSE output signal (106 or 108), the PD module 410 recombines the two polarization component signals in a manner so that the polarization of the output signal (106 or 108) is the same as that of the original input signal 102.

The insertion of the PD module 410 into the configuration of the WSSE 400 is depicted in FIG. 4A. FIG. 4B is a three-dimensional drawing of the configuration. The splitting of the input signal 102 into two signals is shown, as well as the recombination of the two signals to create each of the output signals 106 and 108. The construction and operation of such a PD module 410 is described in further detail below in relation to FIGS. 5 and 6.

Figure 5:
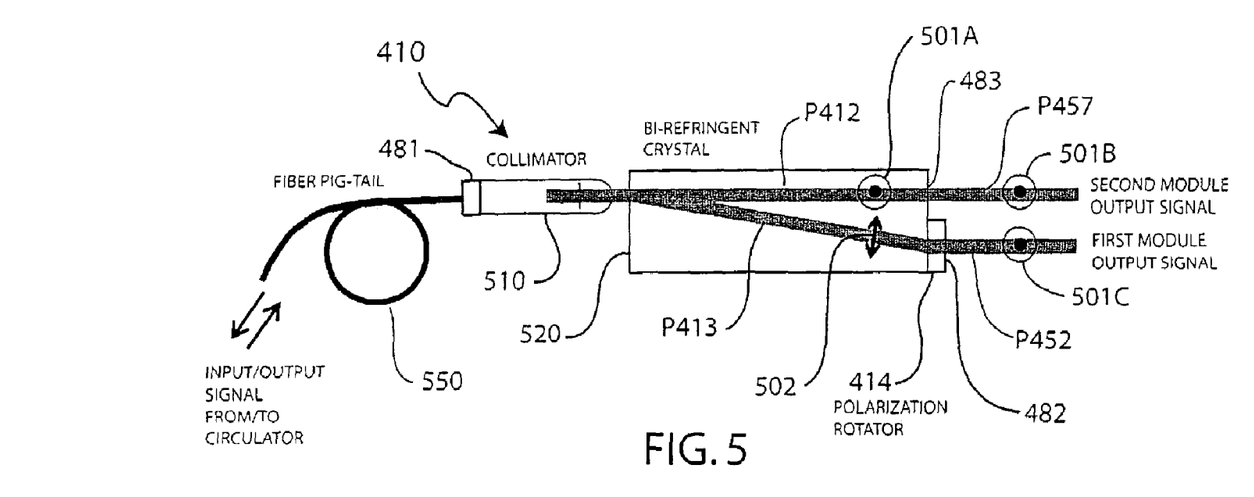
FIG. 5 schematically shows a polarization diversity module in accordance with an embodiment of the present invention.

Referring now to FIG. 5, there is schematically shown a polarization diversity module 410 in accordance with an embodiment of the present invention. As shown in FIG. 5, diversity module 410 may comprise a collimator 510, a bi-refringent crystal 520, and a polarization rotator 414. Optical signals may go in and out of diversity module 410 via a pig-tail 550 of a fiber-optic cable, which in turn may be coupled to a circulator. Note that depending on the application, a circulator may also be integrated in diversity module 410.

An optical input signal may enter collimator 510 via pig-tail 550. Similarly, an optical output signal from collimator 510 may enter pig-tail 550 and propagate out to the rest of the system. Collimator 510 may be a collimating lens configured to direct an input signal into bi-refringent crystal 520, and to direct an output signal from bi-refringent crystal 520 into pig-tail 550.

In one embodiment, bi-refringent crystal 520 is configured to decompose an input signal from collimator 510 into two orthogonally polarized and spatially separated signals, namely a P-polarized signal on an optical path P412 and an S-polarized signal on an optical path P413. Bi-refringent crystal 520 may be an yttrium vanadate (YVO$_4$) crystal, for example. Note that in FIG. 5, symbols 501 (i.e., 501A, 501B, 501C) represent a P-polarized signal, while symbol 502 represents an S-polarized signal. Also note that in the present disclosure, a P-polarized signal and an S-polarized signal are identified with respect to the plane of incidence at the grating 302. In particular, a P-polarized signal is in parallel with the plane of incidence, whereas an S-polarized signal is perpendicular to the plane of incidence. The plane of incidence is formed by light beams impinging on, and light beams diffracted from, a grating 302.

A bi-refringent crystal, in general, is a doubly refracting material. That is, a bi-refringent crystal has two indices of refraction. Light entering a bi-refringent crystal along a direction not parallel to the optical axis of the crystal will be divided into two orthogonal beams propagating in different directions. Embodiments of the present invention take advantage of this property to spatially separate an optical input signal into its two polarization state components.

Still referring to FIG. 5, polarization rotator 414 may be coupled to bi-refringent crystal 520 to convert the S-polarized signal on path P413 to a P-polarized signal on path P452. This allows the first module output signal on path P452 to have the same polarization state as the second module output signal on path P457. In this example, both the first and second module output signals are P-polarized. Both of the module output signals may also be S-polarized by placing polarization rotator 414 in path P457 instead of in path P452. Polarization rotator 414 may be a half-wave plate, for example. A half-wave plate, in general, is an optical component that can be adjusted to rotate a polarization angle by 90 degrees. Thus, a half-wave plate converts an S-polarized signal to a P-polarized signal or vice versa.

From paths P452 and P457, the first and the second module output signals, respectively, propagate as the polarization diversified input signals that are adapted to be directed to the grating 302.

It is to be noted that a P-polarized input signal going into port 481 will come out of port 483 as a P-polarized second module output signal, while an S-polarized input signal going into port 481 will come out of port 482 as a P-polarized first module output signal. An arbitrarily polarized input signal going into port 481 will be split into two spatially separated beams that are both P-polarized as discussed above. P-polarized signals coming back to bi-refringent crystal 520 through port 482, port 483, or both are recombined as an output signal on port 481 and propagate back to the rest of the system. Preferably, to minimize variations in the output signal coming out of port 481, the first and second module output signals are optically processed in substantially identical fashion in the WSSE 300.

As can be appreciated from the foregoing, the first and second module output signals of diversity module 410 will have the same polarization state regardless of the polarization state of an input signal entering the diversity module. Advantageously, this ensures that light beams propagating in the WSSE 300 will have the same polarization state, thereby mitigating the effects of polarization dependent loss.

The optical components of diversity module 410, such as collimator 510, bi-refringent crystal 520, and polarization rotator 414 are preferably, but not necessarily, micro-optical components. Micro-optical components are substantially smaller than regular size optical components, and are thus advantageously more compact. Micro-optical components are commercially available from various manufacturers including Koncent Communications, Inc. of China. Micro-optical implementation is based on very mature technology and has been proven to meet the very stringent requirements of the optical communication industries (such as Telcordia standards). For example, a polarization diversity module 410 with micro-optical components may be fabricated in accordance with an embodiment of the present invention to conform to the following specifications:

a) operable in telecommunication wavelengths of 1525 nm to 1570 nm (C-band);

b) a first module output signal and a second module output signal with optics axes that are parallel to each other;

c) a first module output signal and a second module output signal having a beam diameter of 1.6 mm ($e^{-2}$);

d) a first module output signal and a second module output signal having a beam center-to-center separation of 2.5 mm; and e) a first module output signal and a second module output signal that are both P-polarized.

Figure 6:
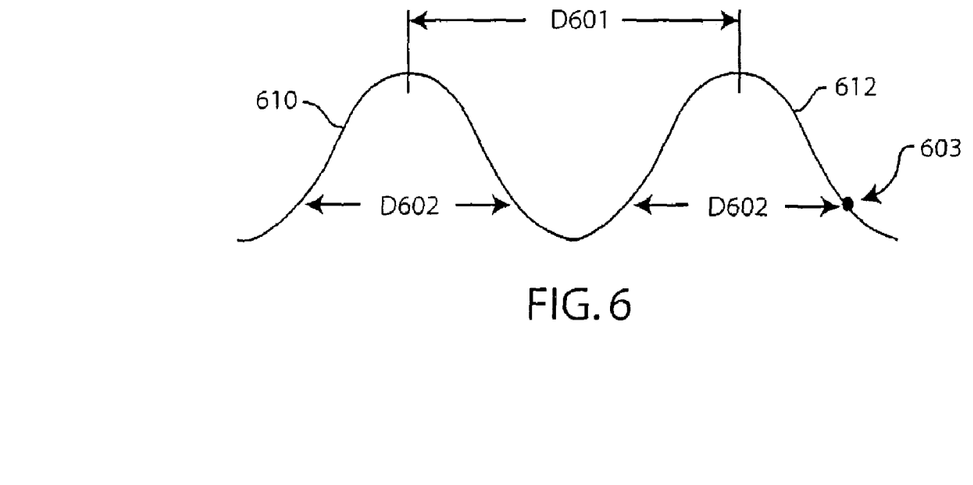
FIG. 6 schematically shows module output signals in accordance with an embodiment of the present invention.

FIG. 6 schematically shows a first module output signal 610 and a second module output signal 612 in accordance with an embodiment of the present invention. First module output signal 610 may be an output of diversity module 410 coming out of port 482, while second module output signal 612 may be an output of diversity module 410 coming out of port 483. In FIG. 6, a dimension D601 represents the separation between the beams of signals 610 and 612. As mentioned, dimension D601 may be 2.5 mm. A dimension D602 represents beam diameter as measured at a point 603, which may be a point where the amplitude of the beam is 13.5% of peak amplitude. As mentioned, dimension D602 may be 1.6 mm.

Figure 7A:
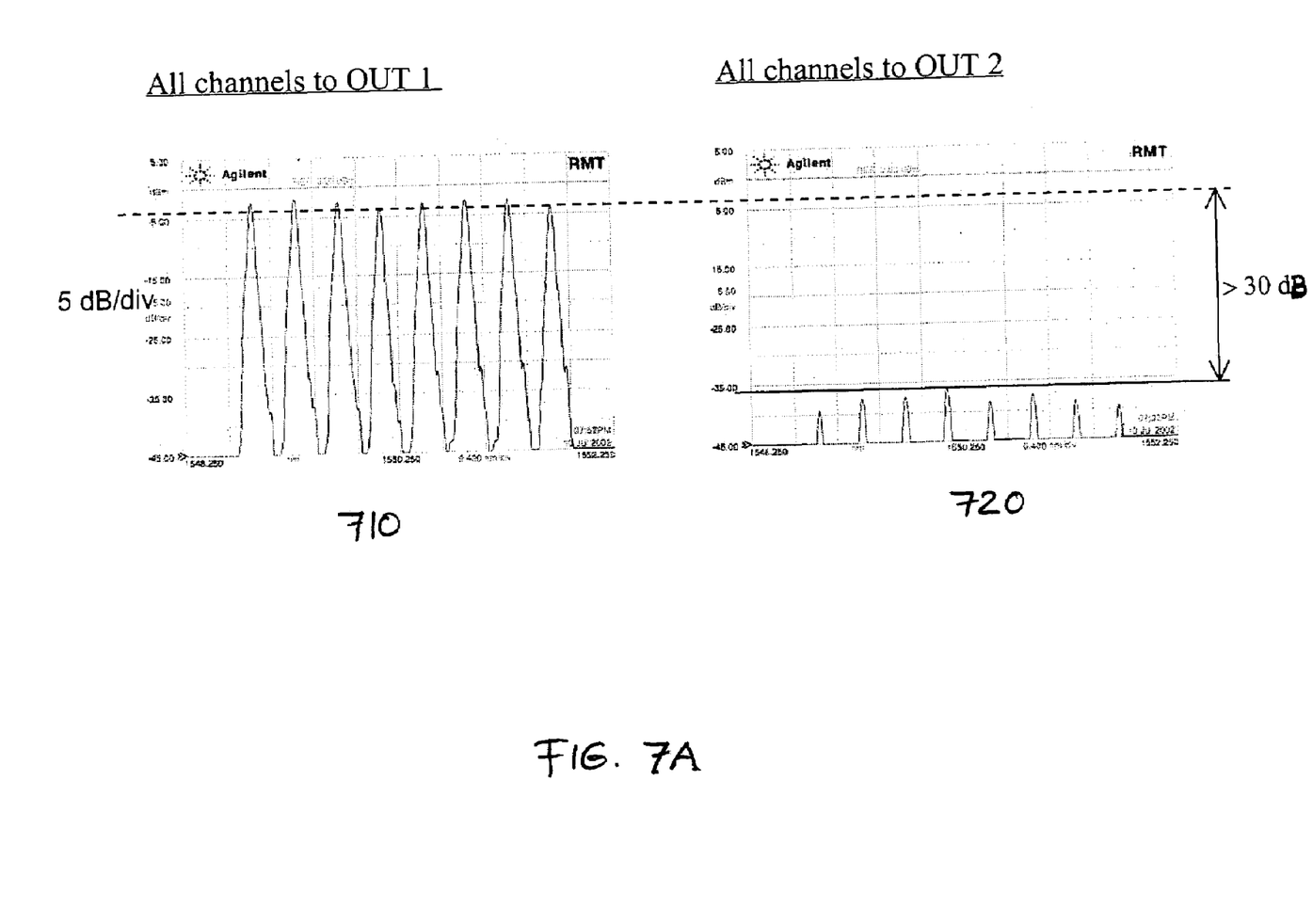
FIGS. 7A and 7B depict experimental results of a 1×2 WSSE with polarization diversity in accordance with an embodiment of the invention.
Figure 7B:
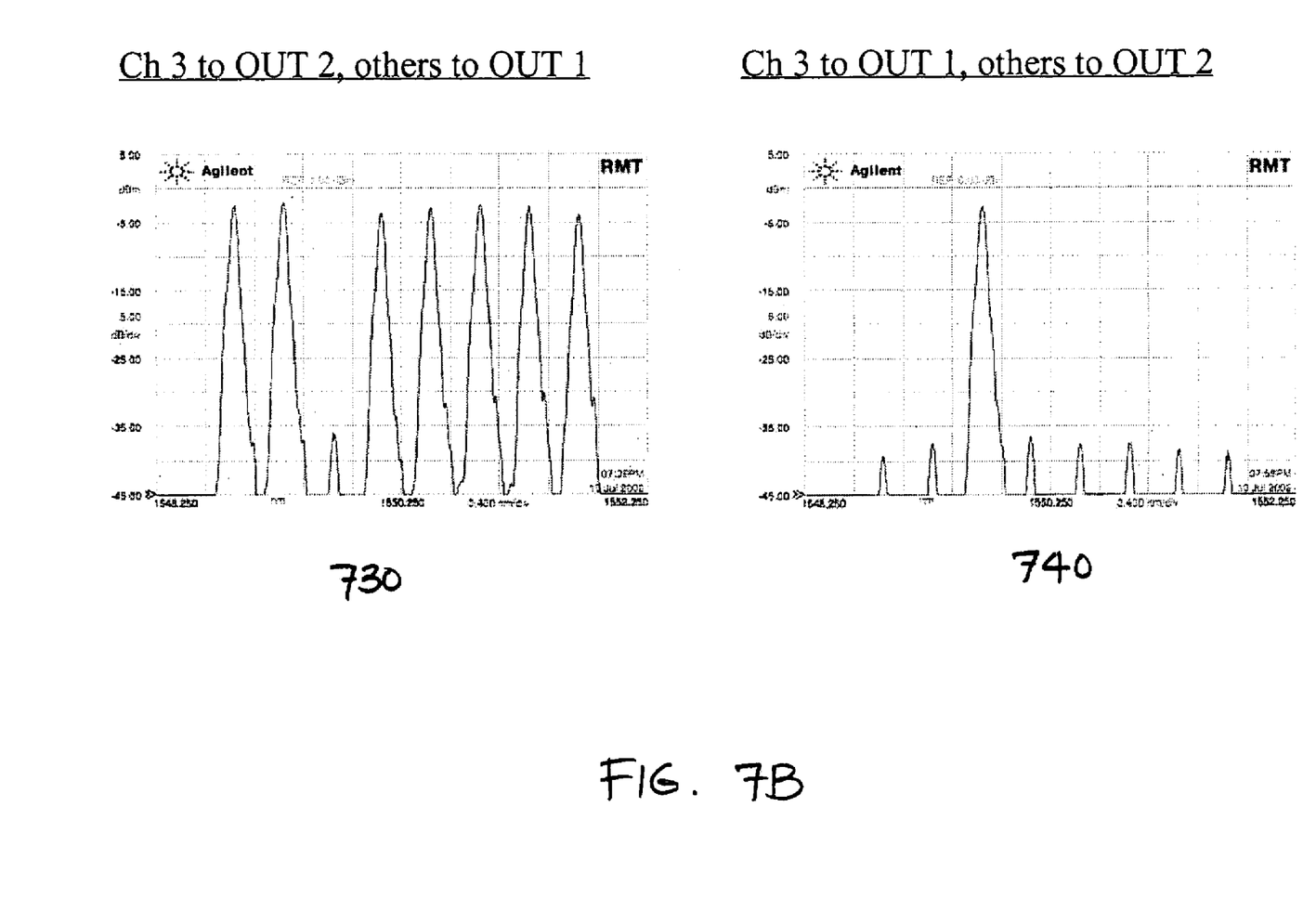

FIGS. 7A and 7B depict experimental results of a 1×2 WSSE with polarization diversity in accordance with an embodiment of the invention. In this instance, the WDM input signal included eight wavelength components (also called channels). The graphs show the signal strength versus wavelength for Output 1.

The left graph 710 in FIG. 7A shows the results when the WSSE is set such that each of the eight channels is switched to Output 1. The right graph 720 in FIG. 7A shows the results when the WSSE is set such that each of the eight channels is switched to Output 2. As seen from the graphs, the WSSE effectively switched each of the eight channels with negligible crosstalk between Outputs 1 and 2. The difference in amplitudes between a wavelength component switched to Output 1 and one switched away from Output 1 is shown to be greater than 30 dB.

The left graph 730 in FIG. 7B shows the results when the WSSE is set to switch all but the third channel to Output 1 (the third channel being switched to Output 2). This demonstrates the wavelength-selective switching capability of the WSSE device. Conversely, the right graph 740 in FIG. 7B illustrates the results when the WSSE is set to switch only the third channel to Output 1 (the remaining channels being switched to Output 2).

Polarization-dependent loss was measured to be about 0.25 dB. This was advantageously mitigated by the built-in PDM 410 in our prototype device.

In the present disclosure, numerous specific details are provided such as examples of apparatus, process parameters, materials, process steps, and structures to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

While specific embodiments of the present invention have been provided, it is to be understood that these embodiments are for illustration purposes and not limiting. Many additional embodiments will be apparent to persons of ordinary skill in the art reading this disclosure. Thus, the present invention is limited only by the following claims.

What is claimed is:

1. A method for wavelength-selective switching and equalization, the method comprising:

dispersing an incoming multiplexed signal into wavelength components;

focusing the wavelength components onto different portions of a controllable light diffractor; and controllably diffracting each wavelength component such that each component is individually modulated and arrives at an individually selected output without substantial crosstalk between the outputs, wherein diffracting each wavelength component is performed using separate groups of reflective members, wherein each group is divided into a first subgroup and a second subgroup, each subgroup having a same number of at least two reflective members, wherein the reflective members of the first subgroup are spaced in equally-spaced steps, the reflective members of the second subgroup are spaced in the same equally-spaced steps, and the second subgroup is displaced from the first subgroup by an intersubgroup displacement, wherein said spacing minimizes crosstalk between the outputs, and wherein the intersubgroup displacement is controllably varied to modulate a diffraction efficiency for equalization while said crosstalk remains at a minimum for switching functionality.

2. The method of claim 1, wherein said diffraction efficiency is at a minimum value when the intergroup displacement is zero.

3. The method of claim 1, wherein said diffraction efficiency is at a maximum value when the intergroup displacement is $\lambda$ divided by 4, where $\lambda$ is a wavelength of the wavelength component received by that group of reflective members.

4. A wavelength-selective switching apparatus with integrated equalizer functionality, the apparatus comprising:

an input for receiving an incoming multiplexed signal having a plurality of wavelength components;

a first output for transmitting a first outgoing signal;

a second output for transmitting a second outgoing signal; and an optical system coupled to receive the incoming multiplexed signal and configured to switch each of the wavelength components to an individually selected output, wherein the optical system is further configured to individually attenuate each of the wavelength components by a controllable amount, wherein the optical system comprises a grating configured to disperse the incoming multiplexed signal into the plurality of wavelength components and a controllable light diffractor array configured to receive the plurality of wavelength components and controllably diffract each wavelength component such that each of the components arrives at the individually selected output, wherein the controllable light diffractor array comprises a plurality of light diffraction devices, wherein each light diffraction device comprises a group of 2N reflective members which is divided into a first subgroup of N reflective members and a second subgroup of N reflective members, where N is an integer of at least two, wherein the reflective members of the first subgroup are spaced in steps, the reflective members of the second subgroup are spaced in steps, and the second subgroup is displaced from the first subgroup by an intersubgroup displacement, and wherein the intersubgroup displacement controls modulation of the wavelength component received by that light diffraction device for equalization without inducing crosstalk between the first output and the second output for switching functionality.

5. The apparatus of claim 4, wherein said spacing between the steps minimizes crosstalk between the first output and the second output.

6. The apparatus of claim 4, wherein said spacing between steps is about $\lambda$ divided by 4N, where $\lambda$ is a wavelength of the wavelength component received by that light diffraction device.

7. The apparatus of claim 4, further comprising a Fourier transform lens adapted to focus the plurality of wavelength components onto different portions of the controllable light diffractor array.

8. The apparatus of claim 4, further comprising a polarization diversity module coupling the optical system to the input and the outputs.

9. The apparatus of claim 8, wherein the polarization diversity module is configured to reduce polarization-dependent loss of the optical system.

10. The apparatus of claim 4, wherein said diffraction efficiency is at a minimum value when the intergroup displacement is zero.

11. The apparatus of claim 4, wherein said diffraction efficiency is at a maximum value when the intergroup displacement is $\lambda$ divided by 4, where $\lambda$ is a wavelength of the wavelength component received by that light diffraction device.

* * * * *